UNITED STATES PATENT OFFICE.

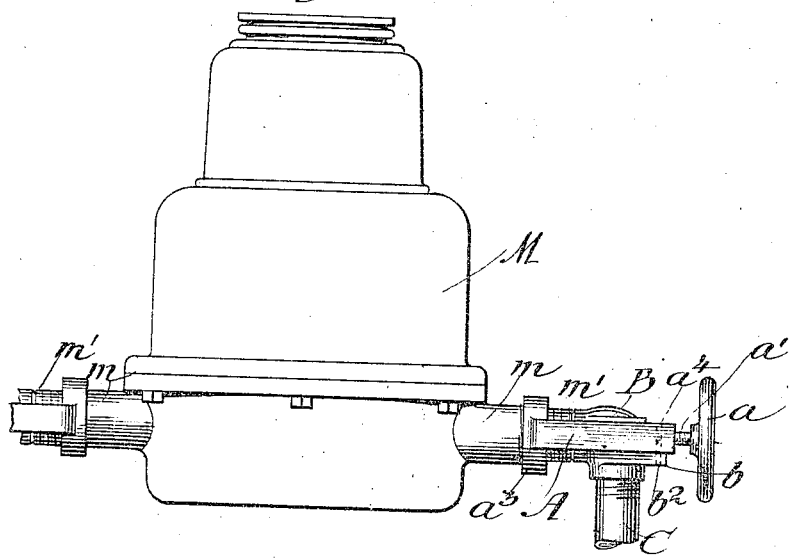
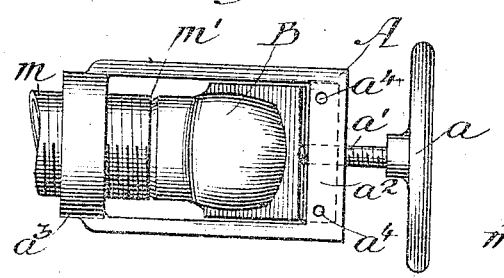
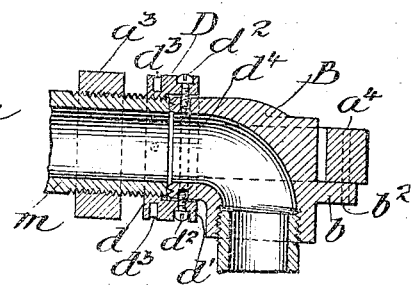
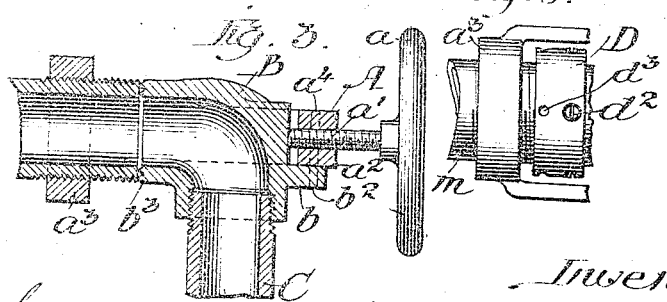

HORACE W. CLARK, OF MATTOON, ILLINOIS.

PIPE-COUPLING.

1,015,990.  Specification of Letters Patent.  Patented Jan. 30, 1912.

Application filed January 16, 1911. Serial No. 603,025.

*To all whom it may concern:*

Be it known that I, HORACE W. CLARK, a citizen of the United States, residing at Mattoon, county of Coles, and State of Illinois, have invented certain new and useful Improvements in Pipe-Couplings, of which the following is a true specification, reference being had to the accompanying drawings.

My invention is an improvement in couplings where one member is obliged to bear the weight of the other member such as is oft times employed in coupling water meters and the like onto service pipes where the weight of the meter must rest on the pipes.

In the drawings, Figure 1 represents a water meter attached to a service pipe by the use of my coupling. Fig. 2 is a plan view of coupling. Fig. 3 is a sectional elevation of the same. Figs. 4 and 5 are details of modifications of my invention.

More particularly described, M represents a meter carrying spuds $m$ $m$ designed to form one member of the joint to be coupled. $m$ $m$ are exteriorly threaded at their outer ends and present coupling faces $m'$ $m'$ on which by preference I make smooth faces. I provide a frame A rectangular in form carrying at one end a shelf or bracket $a^2$ and at its other end an interiorly threaded collar $a^3$ designed to engage the threaded end of the spuds $m$ $m$. Engaging the frame A at the end opposite to the spud $m$ is a screw $a'$ passing laterally through a suitable aperture in the frame A having on its outer end a wheel $a$ for operative purposes.

To the service pipe C is attached by threaded connection an elbow joint B the free end of which is adapted to engage the end of the spud $m$. At this free end of the joint B I provide concentric annular ridges $b^3$ which are so constructed as to conform to the unevennesses of the surface of the end of the spud $m$ under pressure and thereby forming a tight joint without the use of a gasket. However, this is a preference and any form of gasket or packing which will insure a tight joint may be utilized. The side faces of the joint B are squared as shown in Fig. 2 and a shelf $b$ is struck out at right angles from the face of the joint B and adapted to form a support for the meter M by engagement with the frame A at the point $a^2$.

In operation, with the screw $a'$ in a retired position in the frame A, the meter M is placed in position by dropping the frame A upon the joint B and engaging the said frame with the shelf $b$ thus bringing the free end of the joint B in opposition to the outer end of the spud $m$. Then by rotation of the wheel $a$, the screw $a'$ drives the joint B and the spud $m$ into binding contact with each other. The apertures $a^4$ $a^4$ in the frame A and $b^2$ in the shelf $b$ are designed to register each with the other when the coupling is effected and permit the passage of a sealing wire through the two members.

In Figs. 4 and 5, I illustrate a modification of my device. D is a collar threaded interiorly throughout part of its width for the purpose of engaging the end of the spud $m$. Near the free end of the joint B is provided a groove $d^4$ running around the entire circumference of the joint B and parallel with the face of the free end thereof. Through the collar D are passed screws $d^2$ $d^2$ which engage loosely the groove $d^4$. Recesses $d^3$ $d^3$ are provided in the outer face of the collar D. By the use of a wrench inserted in the apertures $d^3$ $d^3$ the collar D may be moved along the end of the spud $m$ and by its engagement with the joint B draw the same into contact with the spud $m$ and form a coupling. By this method we can draw the joint B into contact with the spud $m$ instead of driving it into contact as heretofore described.

I have here described but one coupling and I would have it understood that I utilize two similar couplings applied to the opposite sides of the meter M at the spuds $m$ $m$, one of which is intended for an intake and the other for an outlet.

What I claim as my invention is:—

1. In pipe couplings the combination with a pipe member, a frame rigidly secured near the free end of said pipe member and extending beyond the said end, of another pipe member carrying a shelf near its free end, the said frame of the said first named pipe member being designed to rest upon the said shelf of the second named pipe member in such manner as to permit and maintain the register of the free ends of said pipe members and means for forcing the said pipe members into binding contact with each other.

2. In a pipe coupling the combination with a pipe member, a frame rigidly attached near the free end thereof and projecting beyond the said free end, of another pipe member carrying a shelf near its free end which shelf is adapted to receive the said frame and hold the free ends of the said pipe members in register, and means for forcing the said pipe members into binding contact with each other, consisting of a screw passing laterally through the said frame and engaging the said shelf bearing pipe member.

3. In a pipe coupling the combination with a pipe member and a frame rigidly attached to the free end thereof and projecting beyond the said free end, of another pipe member provided near its end with an elbow, a shelf fitted upon the outer face of the said elbow which shelf is designed to receive the said frame of the first named pipe member and bear the weight thereof and to hold the said pipe members in register with each other, and a screw passing laterally through the said frame and adapted to engage the said shelf bearing pipe member whereby the said pipe members may be driven into binding contact with each other.

HORACE W. CLARK.

Witnesses:
 WILLETT H. CORNWELL,
 INEZ A. BERGSTROM.